US011151504B2

(12) United States Patent
Weinstock et al.

(10) Patent No.: US 11,151,504 B2
(45) Date of Patent: *Oct. 19, 2021

(54) SYSTEMS AND METHODS FOR ELECTRONIC MESSAGING TESTING OPTIMIZATION IN PROSPECT ELECTRONIC MESSAGES SERIES

(71) Applicant: CaaStle, Inc., New York, NY (US)

(72) Inventors: Jonathan Mark Weinstock, Mountain View, CA (US); Georgiy Goldenberg, Los Altos, CA (US); William Scott Goleman, Jr., Half Moon Bay, CA (US)

(73) Assignee: Caastle, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/697,467

(22) Filed: Nov. 27, 2019

(65) Prior Publication Data

US 2021/0158261 A1 May 27, 2021

(51) Int. Cl.
*G06Q 10/06* (2012.01)
*H04L 12/58* (2006.01)
*G06Q 10/10* (2012.01)

(52) U.S. Cl.
CPC ..... *G06Q 10/06393* (2013.01); *G06Q 10/107* (2013.01); *H04L 51/22* (2013.01)

(58) Field of Classification Search
CPC . G06Q 10/06393; G06Q 10/107; H04L 51/22
USPC .................................................. 705/14.42
See application file for complete search history.

(56) References Cited

U.S. PATENT DOCUMENTS

| 11,032,226 | B1* | 6/2021 | Weinstock | H04L 67/26 |
| 2008/0126190 | A1* | 5/2008 | Gosnell | G06Q 30/0224 |
| | | | | 705/14.25 |
| 2014/0156773 | A1* | 6/2014 | Coroy | H04L 51/24 |
| | | | | 709/206 |
| 2016/0117717 | A1* | 4/2016 | Moreau | G06Q 30/0245 |
| | | | | 705/14.42 |
| 2016/0225025 | A1* | 8/2016 | Sinha | G06Q 30/0257 |

(Continued)

OTHER PUBLICATIONS

Subscription-Based Product Price Optimization (Year: 2019).*

(Continued)

*Primary Examiner* — Gautam Ubale
(74) *Attorney, Agent, or Firm* — Bookoff McAndrews, PLLC

(57) ABSTRACT

Disclosed are methods, systems, and non-transitory computer-readable medium for optimizing user experience with respect to email journeys. For example, a method may include determining a first development subset, a first quality assurance subset, and a first production subset of a first plurality of user identifiers; determining and transmitting a first development set of messages, a first quality assurance set of messages, and a first production set of message; determining a development performance indicator, a quality assurance performance indicator, and a production performance indicator based on one or more messages received in response to the transmitted first development set of messages, first quality assurance set of messages, and first production set of message, respectively.

17 Claims, 7 Drawing Sheets

(56) References Cited

U.S. PATENT DOCUMENTS

2016/0293133 A1\* 10/2016 Dutt ........................ A63F 13/57
2017/0017971 A1\* 1/2017 Moreau .............. G06Q 30/0255

OTHER PUBLICATIONS

Can 'Clothing-as-a-Service' fashion a future for retail in a Subscription Economy (Year: 2019).\*
CaaStle CEO: Our Clothing as a Service (CAAS) Technology is not Disruptive (Year: 2018).\*
Design of a Location-based Publish Subscribe Service using a Graph-based Computing Model (Year: 2017).\*

\* cited by examiner

SYSTEMS AND METHODS FOR ELECTRONIC MESSAGING TESTING OPTIMIZATION IN PROSPECT ELECTRONIC MESSAGES SERIES

TECHNICAL FIELD

Various embodiments of the present disclosure generally relate to optimizing user experience, and more particularly, to optimizing user experience with respect to email journeys.

BACKGROUND

Conventional methods of testing and optimizing email journeys fail to mitigate risk for poor performing tests in a nimble and agile manner. Additionally, some conventional methods are onerous to setup which reduces testing throughput and introduces additional risk from human error.

A first example of a conventional method includes setting up a multi-pathed email journey within a marketing platform (e.g., a salesforce marketing cloud). While this method may enable the creation of multiple paths within an email journey and facilitate testing, this method is difficult to setup, which thereby increases the likelihood of human error and reduces testing throughput. Additionally, this method is monolithic and inflexible due to the fact that all variations of control have to be setup at a same time and the sequence also has to be started at the same time.

A second example of a conventional method includes setting up multiple atomic email journeys. While this method may reduce the setup complexity and eliminate concurrent start requirements, it introduces a risk that entrants to the email journeys may be duplicated across email journeys. Accordingly, this may result in entrants receiving multiple email journey emails.

Accordingly, there remains a significant need for email journey optimization to maximize testing throughput while minimizing the risk of a poorly performing test negatively impacting overall results in addition to minimizing the risk of human setup error and negative user experience outcomes such as receiving duplicated emails.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for optimizing user experience to overcome the problems with conventional methods noted above.

In one embodiment, a computer-implemented method comprises: determining, by one or more processors, a first development subset, a first quality assurance subset, and a first production subset of a first plurality of user identifiers, wherein each of the first plurality of user identifiers is associated with a customer; determining, by the one or more processors, a first development set of messages; transmitting, by the one or more processors, the first development set of messages to the first development subset of user identifiers; receiving, by the one or more processors, one or more messages in response to the first development set of messages transmitted to the first development subset of user identifiers; determining, by the one or more processors, a development performance indicator based on the one or more messages received in response to the first development set of messages transmitted to the first development subset of user identifiers; determining, by the one or more processors, a first quality assurance set of messages; transmitting, by the one or more processors, the first quality assurance set of messages to the first quality assurance subset of user identifiers; receiving, by the one or more processors, one or more messages in response to the first quality assurance set of messages transmitted to the first quality assurance subset of user identifiers; determining, by the one or more processors, a quality assurance performance indicator based on the one or more messages received in response to the first quality assurance set of messages transmitted to the first quality assurance subset of user identifiers; determining, by the one or more processors, a first production set of messages; transmitting, by the one or more processors, the first production set of messages to the first production subset of user identifiers; receiving, by the one or more processors, one or more messages in response to the first production set of messages transmitted to the first production subset of user identifiers; and determining, by the one or more processors, a production performance indicator based on the one or more messages received in response to the first production set of messages transmitted to the first production subset of user identifiers.

In accordance with another embodiments, a computer system comprises: a data storage device storing processor-readable instructions; and a processor configured to execute the instructions to perform a method. The method may include: determining a first development subset, a first quality assurance subset, and a first production subset of a first plurality of user identifiers, wherein each of the first plurality of user identifiers is associated with a customer; determining a first development set of messages; transmitting the first development set of messages to the first development subset of user identifiers; receiving one or more messages in response to the first development set of messages transmitted to the first development subset of user identifiers; determining a development performance indicator based on the one or more messages received in response to the first development set of messages transmitted to the first development subset of user identifiers; determining a first quality assurance set of messages; transmitting the first quality assurance set of messages to the first quality assurance subset of user identifiers; receiving one or more messages in response to the first quality assurance set of messages transmitted to the first quality assurance subset of user identifiers; determining a quality assurance performance indicator based on the one or more messages received in response to the first quality assurance set of messages transmitted to the first quality assurance subset of user identifiers; determining a first production set of messages; transmitting the first production set of messages to the first production subset of user identifiers; receiving one or more messages in response to the first production set of messages transmitted to the first production subset of user identifiers; and determining a production performance indicator based on the one or more messages received in response to the first production set of messages transmitted to the first production subset of user identifiers.

In accordance with another embodiment, a non-transitory computer-readable medium containing instructions that, when executed by a processor, may cause the processor to perform a method. The method may include determining a first development subset, a first quality assurance subset, and a first production subset of a first plurality of user identifiers, wherein each of the first plurality of user identifiers is associated with a customer; determining a first development set of messages; transmitting the first development set of messages to the first development subset of user identifiers; receiving one or more messages in response to the first development set of messages transmitted to the first development subset of user identifiers; determining a development performance indicator based on the one or more messages received in response to the first development set of messages transmitted to the first development subset of user identifiers; determining a first quality assurance set of messages; transmitting the first quality assurance set of messages to the first quality assurance subset of user identifiers; receiving one or more messages in response to the first quality assurance set of messages transmitted to the first quality assurance subset of user identifiers; determining a quality assurance performance indicator based on the one or more messages received in response to the first quality assurance set of messages transmitted to the first quality assurance subset of user identifiers; determining a first production set of messages; transmitting the first production set of messages to the first production subset of user identifiers; receiving one or more messages in response to the first production set of messages transmitted to the first production subset of user identifiers; and determining a production performance indicator based on the one or more messages received in response to the first production set of messages transmitted to the first production subset of user identifiers.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
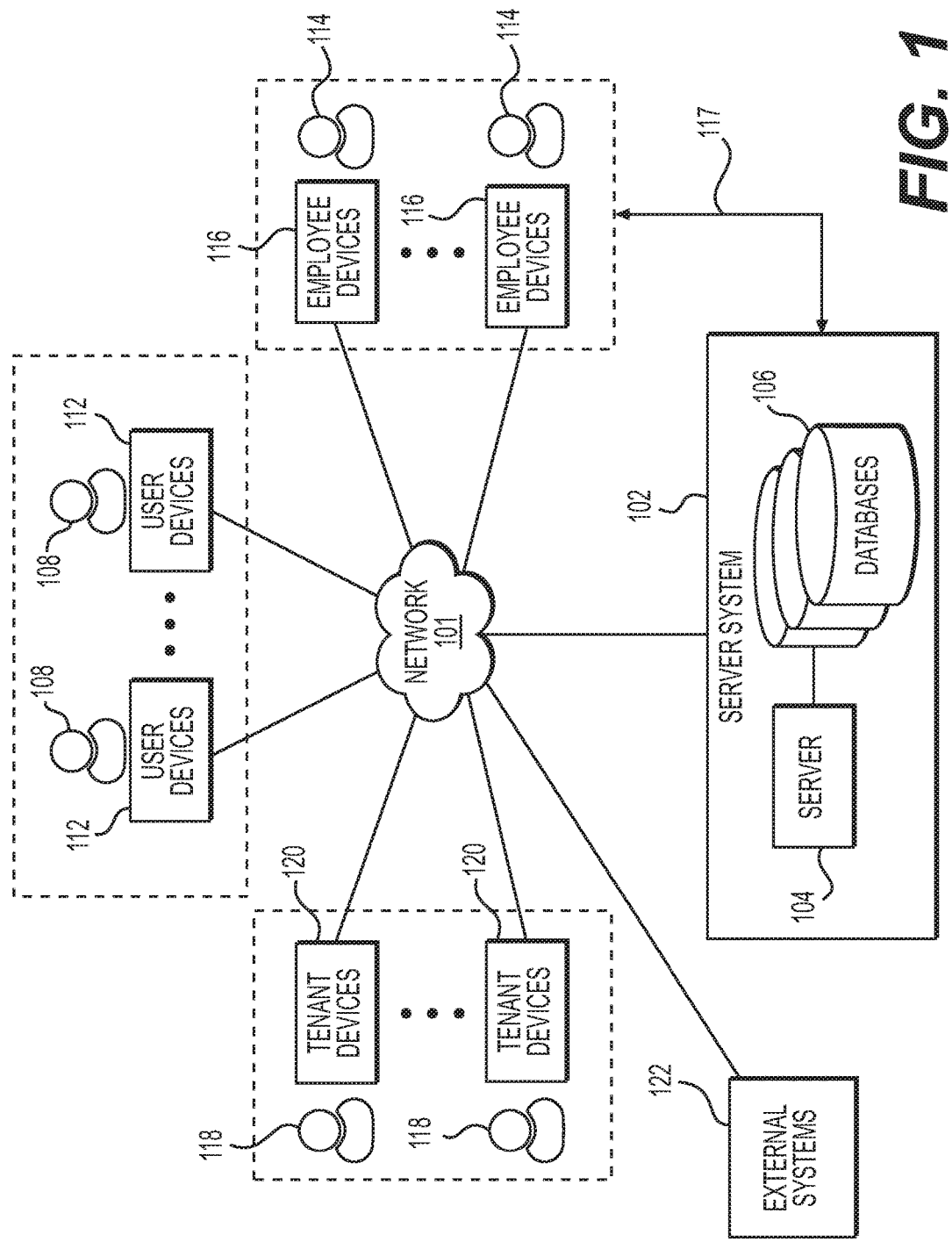
FIG. 1 depicts an example environment in which methods, systems, and other aspects of the present disclosure may be implemented.

Reference will now be made in detail to the exemplary embodiments of the disclosure, examples of which are illustrated in the accompanying drawings. Wherever possible, the same reference numbers will be used throughout the drawings to refer to the same or like parts.

The present disclosure enables a configuration of multiple concurrent tests including one or more email journeys, e.g., an email journey may be referred to as a sequence of emails evaluated both individually and collectively as a group, while utilizing dynamic traffic allocation to modify a percentage of incoming daily prospect cohort to each of the concurrent tests based on test results accrued prior to receiving the current prospect cohort.

The present disclosure provides a significant advantage in maximizing testing throughput, which increases the speed of learning and optimization, while minimizing risk, e.g., overall business risk, from a poorly performing email journey. Additionally, the present disclosure provides another significant advantage in reducing risk due to human error while enabling a high testing throughput rate. Furthermore, the present disclosure provides a significant advantage in enabling granular control of a prospect cohort exposed to a test variant.

In some embodiments, the present disclosure may utilize separate environments to develop new features and/or concepts, test a discrete set of changes (for example, discrete changes to email journeys), and release the discrete set of changes to the public. In some embodiments, the present disclosure may determine one or more production email journey sets, quality assurance email journey sets, and/or development email journey sets, as will be described in further detail below. The production email journey set may comprise an optimized set of emails. The quality assurance email journey set may comprise the next candidates for the optimized set of emails pending validation. The development email journey sets may comprise another set of emails for testing.

In some embodiments, the present disclosure may determine one or more groups based on new prospects from a previous day. For example, the new prospects may be divided into three groups: (1) a development set, (2) a quality assurance set, and (3) a production set. The production set email journey may be allocated to the subset of the prospects assigned to the production set, the quality assurance set email journey may be allocated to the subset of the prospects assigned to the quality assurance set, and the development set email journey may be assigned to the subset of the prospects assigned to the development set. Accordingly, the prospects assigned to the production set may experience the production set email journey, the prospects assigned to the quality assurance set may experience the quality assurance set email journey, and the prospects assigned to the development set may experience the development set email journey.

The significant advantages provided by the present disclosure include: (1) dynamic traffic allocation to the concurrent test flows may be adjusted on a daily basis for the following day's incoming cohort based on a performance of each of the tests; (2) each of the test environments may be derived from a replica of the production set email journey allowing for compartmentalized change and risk mitigation; (3) avoids monolithic test structures which reduces complexity and risk of human error; (4) risk mitigation through traffic allocation to ensure that prospect cohorts are mutually exclusive and exhaustive; and (5) progressive allocation of traffic with higher percentages of the total eligible cohort inversely proportional to the risk encapsulated by that environment. For example, the higher risk development environments may have lower over-all traffic to validate new concepts, as will be described in further detail below.

While the exemplary system architecture as described in the present disclosure relates to electronic transactions for subscribing to, purchasing, or renting wearable items (e.g., clothing-as-a-service (CaaS) or Try-Then-Buy (TTB) service), implementations disclosed herein may effectively serve various other online transactions in the context of any other subscription, purchase, rental, or retail services without departing from the scope of the disclosure, such as, for example, subscribing to or making purchases in a software service, cleaning service, delivery service, maintenance service, rental product, rental vehicles, etc. In addition, while some descriptions and examples disclosed in the present disclosure refer to certain exemplary transactions as transactions pertaining to "apparel" or "garments," all of those transactions may effectively serve any wearable item (e.g., an article of clothing, apparel, jewelry, hat, accessories, or any other product which may be worn), or even hospitality linens, consumer goods, or any other textile fabrics, without departing from the scope of the disclosure.

As used in the present disclosure, the term "CaaS" (i.e., clothing-as-a-service) may collectively refer to computer-implemented services and functions associated with subscription, purchase, and/or rental services for users (e.g., periodic subscription for receiving wearable items, apparel rental or purchase order, distribution, return processing, TTB services, account management, marketing, customer service, warehouse operations, etc.). As used in the present disclosure, the term "wearable item" may refer to any article of clothing, apparel, jewelry, hat, accessories, or other product which may be worn by a person, an animal, or a thing, or be used as an ornament for a person, an animal, or a thing. As used herein, the term "closeting" or "to closet" may refer to a computer-implemented operation of placing one or more garments into a virtual closet (e.g., a cart, a repository, or any type of space which may be virtually associated with a particular set of one or more garments for a future transaction). Additionally, "matching" may refer to a computer-implemented operation of determining a set of one or more garments for allocating to a user and/or determining wearability metrics for given garments, and "allocating" or "allocation" may refer to a computer-implemented operation of determining the garments that should be assigned and shipped to one or more particular users.

In accordance with the present disclosure, user interfaces, periodically executed computer-implemented services, ad hoc services, and automations being integrated together in a connected platform may be achieved by a uniquely configured system architecture, job execution cluster configuring one or more processors to perform both storefront and back office tasks, and various user interfaces providing specialized or customized access to users of different roles. For example, the system may periodically collect vast amounts of data attributes from historical transactions, form data sets indicative of each user's relationship with certain apparel (e.g., a binary flag of whether a shipped garment was actually worn by a user) in the back end, and train a neural network with those data sets to make specific front-end user recommendations with highly wearable apparel. The ordered combination of various ad hoc and automated tasks in the presently disclosed platform necessarily achieve technological improvements through the specific processes described more in detail below. In addition, the unconventional and unique aspects of these specific automation processes represent a sharp contrast to merely providing a well-known or routine environment for performing a manual or mental task.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

Referring now to the appended drawings, FIG. 1 shows an example environment 100, according to one or more embodiments of the present disclosure. As shown, the example environment 100 may include one or more networks 101 that interconnect a server system 102, user devices 112, employee devices 116, tenant devices 120, and external systems 122. The one or more networks 101 may be, for example, one or more of a cellular network, a public land mobile network, a local area network, a wide area network, a metropolitan area network, a telephone network, a private network, an ad hoc network, an intranet, the Internet, a fiber optic based network, a cloud computing network, etc. User devices 112 may be accessed by users 108, employee devices 116 may be accessed by authorized employees 114, and tenant devices 120 may be accessed by employees of tenant entities 118. In some implementations, employee devices 116 may be used to perform the functions of the tenant devices 120 and/or the user devices 112. Server system 102 may comprise one or more servers 104 and one or more databases 106, which may be configured to store and/or process a plurality of data, microservices, and service components, and/or associated functions thereof, as described in more detail below with respect to FIG. 2.

Users 108 may access the server system 102 through the one or more networks 101 using user devices 112. Each device among the user devices 112 may be any type of computing device (e.g., personal computing device, mobile computing devices, etc.) which allows users 108 to display a web browser or a web-based application for accessing the server system 102 through the network 101. The user devices 112 may, for example, be configured to display a web browser, a web-based application, or any other user interface (e.g., one or more mobile applications) for allowing users 108 to exchange information with other device(s) or system(s) in the environment 100 over the one or more networks 101. For example, a device among the user devices 110 may load an application with a graphical user interface (GUI), and the application may display on the GUI one or more apparel recommendations for closeting by the user. Users 108 accessing user devices 112 may be, for example, users and/or potential users of apparel made available for subscription-based distribution via electronic transactions and physical shipment. Additionally, or alternatively, users 108 may access user devices 112 to, for example, manage one or more user accounts, view catalogs, configure one or more user profiles, engage in customer service communications, make purchase orders, track shipments, generate shipments, monitor order fulfillment processes, initiate or process returns, order apparel for purchase, provide feedback, refer other users, navigate through various features such as size advisor, perform personalized discovery, and/or make recommendations.

Employee devices 116 may be configured to be accessed by one or more employees 114, including, for example, customer service employees, marketer employees, warehouse employees, analytics employees, or any other employees who are authorized and/or authenticated to perform tasks, operations, and/or transactions associated with the server system 102, and/or the external systems 122. In one embodiment, employee devices 116 are owned and operated by the same entity or at least an affiliate of the entity operating the e-commerce (e.g., CaaS) business hosted on server systems 102. Each device among the employee devices 116 may be any type of computing device (e.g., personal computing device, mobile computing devices, etc.). The employee devices 116 may allow employees 114 to display a web browser or an application for accessing the server system 102 and/or the external systems 122, through the one or more networks 101. For example, a device among the one or more of the employee devices 116 may load an application with graphical user interface (GUI), and the application may display on the GUI one or more warehouse operations associated with providing CaaS to users 108. In some implementations, the employee devices 116 may communicate directly with the server system 102 via communications link 117 bypassing public networks 101. Additionally, or alternatively, the employee devices 116 may communicate with the server system 102 via network 101 (e.g., access by web browsers or web-based applications).

Tenant devices 120 may be configured to be accessed by one or more tenants 118. Each device among the tenant devices 120 may be any type of computing device (e.g., personal computing device, mobile computing devices, etc.). As used herein, each tenant, among one or more tenants 118, may refer to an entity that allocates and/or supplies one or more specific collections of apparel for the CaaS inventory. For example, each of the one or more tenants 118 may be a retailer, a designer, a manufacturer, a merchandizer, or a brand owner entity that supplies one or more collections of wearable items to the CaaS inventory managed and/or accessed by the server system 102. In some embodiments, tenants 118 may use one or more electronic tenant interfaces (e.g., a catalog content management system associated with each tenant) to provide the server system 102 with wearable item data that describe apparel or wearable items made available for electronic transactions on server system 102. For example, one or more catalogs for each of the one or more tenants 118 may be generated and/or updated at the server system 102 dynamically and/or periodically. Tenant devices 120 may serve as access terminals for the tenants 118, for communicating with the electronic tenant interfaces and/or other subsystems hosted at the server system 102. The tenant devices 120 may, for example, be configured to display a web browser, an application, or any other user interface for allowing tenants 118 to load the electronic tenant interfaces and/or exchange data with other device(s) or system(s) in the environment 100 over the one or more networks 101.

External systems 122 may be, for example, one or more third party and/or auxiliary systems that integrate and/or communicate with the server system 102 in performing various CaaS tasks. Specific examples of the external systems 122 are described in detail below with respect to FIG. 2. External systems 122 may be in communication with other device(s) or system(s) in the environment 100 over the one or more networks 101. For example, external systems 122 may communicate with the server system 102 via API (application programming interface) access over the one or more networks 101, and also communicate with the employee devices 116 via web browser access over the one or more networks 101.

As indicated above, FIG. 1 is provided merely as an example. Other examples that differ from the example environment 100 of FIG. 1 are contemplated within the scope of the present embodiments. In addition, the number and arrangement of devices and networks shown in system 100 are provided as an example. In practice, there may be additional devices, fewer devices and/or networks, different devices and/or networks, or differently arranged devices and/or networks than those shown in system 100. Furthermore, two or more devices shown in FIG. 1 may be implemented within a single device, or a single device shown in FIG. 1 may be implemented as multiple, distributed devices. Additionally, or alternatively, one or more devices may perform one or more functions of other devices in the example environment 100. For example, employee devices 116 may be configured to perform one or more functions of tenant devices 120, in addition to their own functions.

Figure 2:
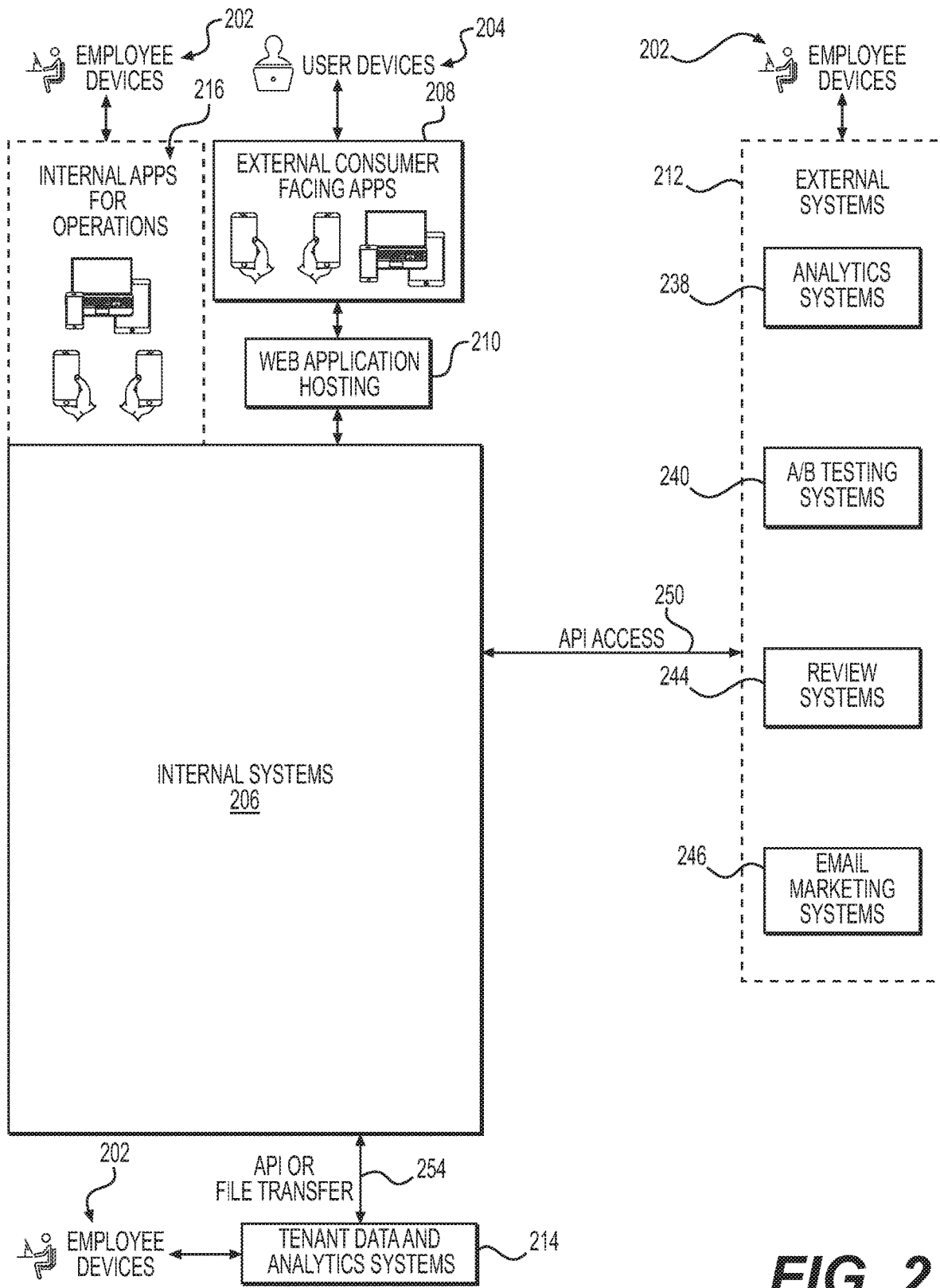
FIG. 2 depicts a schematic diagram depicting an architecture of an exemplary environment for a clothing-as-a-service electronic platform, according to one or more embodiments.

FIG. 2 depicts a schematic diagram of an exemplary architecture 200 for a clothing-as-a-service electronic platform, according to one or more embodiments. The components of the architecture may be accessed by authorized terminals, such as employee devices 202 and user devices 204, over the one or more networks 101 or via any one or more other types of network (e.g., a cellular network, a public land mobile network, a local area network, a wide area network, a metropolitan area network, a telephone network, a private network, an ad hoc network, an intranet, the internet, a fiber optic based network, a cloud computing network, etc.). As used herein, the user devices 204 may correspond to any one or more user devices 112 depicted in FIG. 1, and the employee devices 202 may correspond to any one or more of the employee devices 116 and/or tenant devices 120 depicted in FIG. 1.

As shown in FIG. 2, in general, architecture 200 may comprise an internal system 206, external consumer facing apps 208, a web application hosting server 210, external systems 212, and tenant data and analytics systems 214. Internal system 206 may comprise internal apps for operations, API endpoints, app endpoints, login endpoints, tenant aware services, tenant aware transactional data stores, back office jobs, data warehouse systems, file stores-snapshots, and $3^{rd}$ party data ETL processes.

In operation, employee devices 202 may access the internal system 206, which may be stored at networked, distributed, and/or local systems (e.g., one or more virtual private clouds and/or one or more physical private networks). As used herein, a virtual private cloud may refer to a configurable pool of shared computing resources within a cloud environment, with groups of shared computing resources being allocated for a particular job(s), user(s) and/or a purpose(s). The internal system 206 may represent a virtual private cloud allocated for hosting the entirety of the internal system 206. Additionally, the internal system 206 may include multiple virtual private clouds (e.g., subsets of the larger virtual private cloud encompassing the internal system 206), each allocated for one or more particular tasks, users, or purposes (e.g., tenant aware services, back office jobs, and data warehouse systems).

The employee devices 202 may communicate with the internal system 206 through one or more internal apps 216 comprising one or more web-based portals or user interfaces for operations. The one or more internal apps 216 may be, for example, an electronic warehouse operations portal and/or an electronic administrative portal. The one or more internal apps 216 may include one or more web-based user interfaces, such as, for example, one or more mobile applications compatible with predetermined mobile device operating systems, a software application developed for desktop operating systems, and/or a web site configured for browser access to web pages via one or more networks (e.g., the Internet or an intranet). Employees 116 or tenants 118 may use employee devices 202 to access the internal system 206 and perform various CaaS functions related to warehouse operations and/or administrative tasks.

The internal system 206 may also include Application Programming Interface ("API") endpoints, APP (application) endpoints, and login endpoints. In some implementations, these endpoints may be hosted in a virtual private cloud or a physical private network with a preconfigured level of isolation from other virtual private clouds or physical private networks hosting different components of the internal system 206. The API endpoints may be locations from which the APIs can access resources of the internal system 206 that the APIs need to carry out their functions. For example, the API endpoints may specify where resources can be accessed by the APIs, while communicating with the APIs requesting information from the internal system 206. Similarly, the APP endpoints may be the locations from which applications (e.g., applications in one or more internal apps 216) may access resources of the internal system 206 they need to carry out their functions, and the login endpoints may be the touchpoints of any communication pertaining to logins (e.g., authentication and access control) associated with the internal system 206. For example, the login endpoints may receive and process login communications, for internal apps 216 and/or external consumer facing applications 208. For some implementations, at least some endpoints among the API endpoints, APP endpoints, and login endpoints, may be tenant branded endpoints, designated to serve particular tenants 118.

The internal system 206 may additionally include tenant aware services and tenant aware transactional data stores. The tenant aware services may include microservices for fulfillment of various CaaS operations hosted in one or more virtual private clouds or one or more physical private networks. For example, the microservices may include, for example, catalog data, account data, data services, customer service functions, marketing functions, warehouse functions, and/or other supporting functions. The tenant aware transactional data stores may be one or more databases that store both raw and processed data resulting from operations of the tenant aware services, the endpoints, external systems 212, and/or tenant data and analytics systems 214. The tenant aware transactional data stores may store, for example, transactional data, batch jobs data, searchable data including various analytics and attributes, event messages, and local logs of various raw data.

The internal system 206 may additionally include back office jobs, which may comprise instructions, files, or executable applications configured to perform various back office tasks and/or computing resources to execute these instructions or applications. The back office jobs may be hosted in, for example, one or more virtual private clouds. The back office jobs may include, for example, all system components that run and update data (e.g., a first order data or any derived data) associated with the internal system 206. Such system components may include, for example, replenishment identifier (RID) generation service(s), size advisor data set, size advisor algorithmic preparation component(s), recommendation service(s), search data sets, etc. The back office jobs may include, for example, ETL (extract, transform, and load) processes that comprise collecting data from multiple different sources (e.g., tenant aware transactional data stores), converting the collected data to other one or more preset formats as deemed necessary, and loading the data into the target database (e.g., data warehouse systems). The back office jobs may also include, for example, periodic data refresh operations, periodic synchronization states among internal and external services, and automated tasks to run in the background at the internal system 206.

The internal system 206 may include the file stores for snapshots in one or more virtual private clouds or one or more physical private networks. The file stores of snapshots may store snapshots capturing states of the internal system 206 at particular points in time. For example, each snapshot may capture settings, files, configurations, and the memory state of the components of the internal system 206. These snapshots may be restored upon request or scheduling, and when a snapshot is restored, settings, and/or the state of the internal system 206 may be returned to the states they were in at the time the snapshots were captured.

The internal system 206 may include third party data ETL processes, which may collect data from different external sources (e.g., external systems 212), convert the collected data to other one or more preset formats as deemed necessary, and load the data into one or more target databases (e.g., data warehouse systems and/or tenant data and analytics system 214).

The internal system 206 may include the data warehouse systems 230 in one or more virtual private clouds or one or more physical private networks. As discussed above with respect to the back office jobs and the third party data ETL processes, the data warehouse systems may be the one or more target databases for ETL processes that collect data from various sources (e.g., the external systems 212 or the tenant aware transactional data stores). The data warehouse systems may then utilize the collected data as, for example, parameters for business intelligence that reveals patterns, analytics, and insights for business decisions associated with the internal system 206.

The exemplary environment 200 may include tenant data and analytics systems 214. The tenant data and analytics systems 214 may be computing resources in communication with one or more components of the internal system 206 in order to collect, store, and/or manage data and analytics associated with the one or more tenants 118. One or more of the tenant data and analytics systems 214 may be located remotely from the internal system 206 (e.g., at tenant servers). The tenant data and analytics systems 214 may communicate with the components of the internal system 206 using API access or file transfer link 254 over one or more networks 101. For example, the tenant data and analytics systems 214 may communicate with the API endpoints of the internal system 206, or receive files from third party data ETL processes. The tenant data and analytics systems 214 may be accessed by employee devices 202, which may correspond to employee devices 116 or the tenant devices 120 depicted in FIG. 1.

As shown in FIG. 2, the exemplary environment 200 may also include user devices 204, which may correspond to the user devices 112 depicted in FIG. 1. Users 108 of the CaaS electronic platform may use the user devices 204 to access the internal system 206, as recipients of the services provided by the components of the internal system 206. For example, the users 108 of the user devices 204 may be one or more registered subscribers who physically receive and wear the items that are distributed via the CaaS electronic platform. As another example, the users 108 of the user devices 204 may be one or more potential subscribers to the CaaS electronic platform. In the context of the current disclosure, a group of such potential subscribers are referred to as a prospect cohort. As shown in FIG. 2, user devices 204 may access the internal system 206 via external consumer facing applications 208. The external consumer facing applications 208 may be browser-accessed web pages or web-based applications that include web-based user interfaces accessible from one or more user devices 204 over one or more networks (e.g., one or more networks 101).

In some implementations, the exemplary environment 200 may include web application hosting server 210 to serve as an intermediary for enabling communications made between the user devices 204 and the internal system 206. The web application hosting server may be an external (e.g. third party) server that provides an online platform for, for example, building a web-based storefront interface and integrating online retail components (e.g., online point-of-sale system) onto the storefront interface, for vendors such as the internal system 206. The web application hosting server 210 may communicate with the internal system 206 (e.g., the API endpoints, the APP endpoints, and/or an employee device 202 logged into the internal system 206), to retrieve necessary information about the internal system 206, and to generate or dynamically update an online storefront for the user devices 204. The user devices 204 may, in turn, access the online storefront generated or dynamically updated by the web application hosting server 210, through the external consumer facing applications 208. In this way, the external consumer facing applications 208 may allow user devices 204 to not only communicate with the internal system 206, but also to communicate with external systems 212. Such communication with the external systems 212 may be enabled by use of one or more API access communication links 250 interconnecting the internal system 206 and the external systems 212.

The exemplary environment 200 may additionally include external systems 212 (e.g., systems corresponding to the external systems 122 depicted in FIG. 1), that may be accessed by employee devices 202 (e.g., devices corresponding to employee devices 116 and/or the tenant devices 120 depicted in FIG. 1), and also by the internal system 206 (e.g., the system corresponding to server system 102 depicted in FIG. 1). The employee devices 202 may access the external systems 212 over one or more networks, using, for example, web browser access or user interfaces included in one or more web-based application. Additionally, as shown in FIG. 2, the internal system 206 may also access the external systems over the one or more networks, using, for example, one or more API access processes 250.

The external systems 212 may include, for example, analytics systems 238, A/B testing systems 240, review systems 244, and email marketing systems 246. The analytics systems 238 may include one or more web analytics tools provided by an external (e.g., third party) server, that provides dashboards, logs, or reports pertaining to, for example, tracking and reporting website traffic for the vendor (e.g., employees 116). For example, an analytics tool may be configured to display poorly functioning pages, where visitors came from, how long the visitors stayed on the website, the visitors' geographical position, visitor segmentation information, sales activity and performance, and detailed information about current visitors. The analytics systems 238 may be accessed by employee devices 202 (e.g., a vendor of these solutions) to, for example, customize settings, data, and/or configurations, and utilize the analytics data for business intelligence.

A/B testing systems 240 may include A/B testing tools for measuring and optimizing user experience by, for example, measuring subjects' response to variant A against variant B and determining which of the two variants is more effective. The A/B testing tool may be provided by an external (e.g., third party) server. In the context of the CaaS electronic platform provided by the internal system 206, the A/B testing systems 240 may perform an A/B test on, for example, a closet interface with a virtual assistant and a closet interface without a virtual assistant. Results of the experimentations may be provided to employee devices 202 (e.g., a vendor of these solutions) to, for example, utilize the results for business intelligence.

The review systems 244 may include user review receiving tools provided by an external (e.g., third party) server. For example, a user review receiving tool in the review systems 244 may provide a platform for users to add reviews, ratings, and/or user generated content such as videos, to be published for display at the external consumer facing applications 208. The review systems 244 may be accessed by employee devices 202 (e.g., a vendor of these tools) to, for example, import reviews for analytics and business intelligence, and/or customize settings and configurations.

The email marketing systems 246 may include email marketing automation and analytics tools, provided by an external (e.g., third party) server. For example, an email marketing automation tool may maintain mailing lists and mailing schedules, and may modify email marketing messages based on what recipients read, click on, or forward. The email marketing systems 246 may be accessed by employee devices 202 (e.g., a vendor of these tools) to, for example, manage communication preferences, the content, and/or vendor subscription settings.

The number and arrangement of devices, components, and communication networks shown in FIG. 2 are provided as an example. In practice, there may be additional devices, components, and/or communication networks, fewer devices, components, and/or communication networks, different devices, components, and/or communication networks, or differently arranged devices, components, and/or communication networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
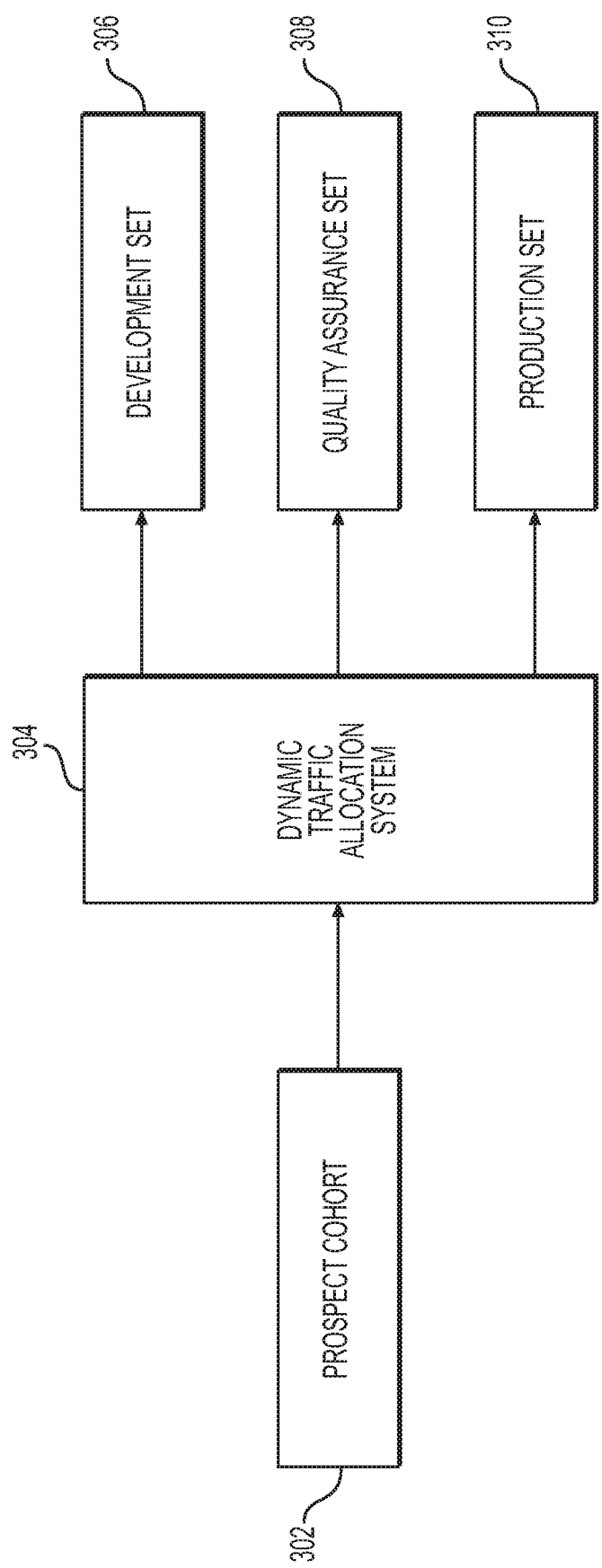
FIG. 3 depicts an exemplary method of optimizing user experience, according to exemplary embodiments of the present disclosure.

FIG. 3 depicts an exemplary method of optimizing user experience, and more particularly, to optimizing user experience with respect to email journeys, according to exemplary embodiments of the present disclosure. In the context of the current disclosure, an email journey may refer to a predetermined set of emails configured to automatically send emails based on predetermined triggers. For example, an exemplary email journey may begin with a welcome email to a user 108 of user device 204. The user 108 may be a potential subscriber to the CaaS electronic platform. The predetermined set of emails may be configured to automatically send a follow up email to the user 108 if an action has not been taken by the user 108 in response to the welcome email after a predetermined period of time. The predetermined set of emails may be configured to automatically send a predetermined response email to the user 108 if the user responds to the welcome email in a predetermined manner. As such, the predetermined period of time and the predetermined manner of response to the welcome email may be examples of the predetermined triggers. Accordingly, the exemplary email journey may include the welcome email, the follow up email, the predetermined response email, and the predetermined triggers, etc. In some embodiments, an email journey may be utilized as an automated process of onboarding new subscribers to the CaaS electronic platform.

In some embodiments, the CaaS electronic platform may utilize three different types of email journeys: (1) a production set email journey which may comprise an optimized predetermined set of emails and configurations; (2) a quality assurance set email journey which may comprise the next candidate set of emails and configurations for the production set email journey pending validation through further testing; and (3) a development set email journey which may comprise a test set of emails and configurations. In some embodiments, the email marketing systems 246 may determine the production set email journey, the quality assurance set email journey, and/or the development set email journey. It is understood that a combination of one or more components of the external systems 212 and/or the internal systems 206 may determine the production set email journey, the quality assurance set email journey, and/or the development set email journey in alternative embodiments.

As shown in FIG. 3, a dynamic traffic allocation system 304 may obtain information associated with a prospect cohort 302. As described above, a prospect cohort may refer to a group of one or more users 108 of the user devices 204 who may be potential subscribers to the CaaS electronic platform. In some embodiments, the dynamic traffic allocation system 304 may obtain information associated with a prospect cohort 302 from a certain period in time. For example, the dynamic traffic allocation system 304 may obtain information associated with a prospect cohort 302 on a daily basis. In such instances, the dynamic traffic allocation system 304 may obtain the prospect cohort 302 from the previous day. In some embodiments, the prospect cohort 302 may be determined based on new email addresses obtained the previous day via the CaaS electronic platform. In some embodiments, the information associated with the prospect cohort 302 may include one or more email addresses and/or unique user identifiers (UUIDs). In some embodiments, the email marketing systems 246 may include the dynamic traffic allocation system 304. It is understood, however, that the dynamic traffic allocation system 304 may be a component of the internal systems 206 and/or the external systems 121 in alternative embodiments.

In some embodiments, the dynamic traffic allocation system 304 may divide the prospect cohort 302 into three groups: (1) a development set 306, (2) a quality assurance set 308, and (3) a production set 310. That is, the dynamic traffic allocation system 304 may split the one or more users 108 of the user devices 204 included in the prospect cohort 302 into the three aforementioned groups. In some embodiments, the dynamic allocation system 304 may divide the prospect cohort 302 by taking a random sample of the prospect cohort 302 based on a predetermined percentage using a hash function from the UUIDs of the prospect cohort 302 and a modulo function. In some embodiments, the UUIDs may be comprised of alpha numeric identifiers. In such embodiments, the dynamic allocation system may convert the UUIDs into numerical identifiers by utilizing the hash function. In the context of the current disclosure, the hash function may be referred to as a mathematical function that maps inputs to a value deterministic of the input value. For example, a same output y may be received for any input value x when the hash function is performed. In some embodiments, a Fowler-Noll-Vo hash function implementation may be utilized as the hash function to perform this mapping. Once the UUIDs have been converted into numeric values, the modulo function may be used to segment the converted UUIDs into multiple distinct groups. In the context of the current disclosure, a modulo function may be referred to as a mathematical function that finds the remainder after division of one number, e.g., a numeric version of a UUID, by another number, e.g., a configurable value representing the number of desired distinct cohort segments. In some embodiments, the output of the modulo function may be applied to a cohort of numeric UUIDs, thereby providing a designation, per UUID, of a number between 0 and the configurable value divisor. The dynamic allocation system may allocate prospect groups by enumerating subsets between 0 and the configurable divisor value to production, quality assurance, and/or development sets. While the current disclosure describes dividing the prospect cohort 302 into three groups, it is understood that the prospect cohort 302 may be divided into any number of groups in alternative embodiments. For example, the prospect cohort 302 may be divided into two groups such as the development set 306 and the production set 310.

In some embodiments, the production set 310 may include a larger number of users from the prospect cohort 302 than the number included in the quality assurance set 308. Similarly, the quality assurance set 308 may include a larger number of users from the prospect cohort 302 than the number included in the development set 306. For example, the production set 310 may include 85 percent of the prospect cohort 302, the quality assurance set 308 may include 10 percent of the prospect cohort 302, and the development set 306 may include 5 percent of the prospect cohort 302. It is understood that the number of users for each respective set 306, 308, 310 may vary in alternative embodiments.

In some embodiments, the production set email journey may be allocated to the subset of the prospect cohort 302 assigned to the production set 310, the quality assurance set email journey may be allocated to the subset of the prospect cohort 302 assigned to the quality assurance set 308, and the development set email journey may be assigned to the subset of the prospect cohort 302 assigned to the development set 306. In some embodiments, the email marketing systems 246 may allocate the email journeys to the respective subsets. It is understood, however, that a combination of one or more components of the internal systems 206 and/or the external systems 212 may allocate the email journeys in alternative embodiments. Accordingly, the prospect cohort 302 assigned to the production set 310 may experience the production set email journey, the prospect cohort 302 assigned to the quality assurance set 308 may experience the quality assurance set email journey, and the prospect cohort 302 assigned to the development set 306 may experience the development set email journey. The dynamic allocation system may allow precise control over the risk tolerance for each group, e.g., the development set 306, the quality assurance set 308, and the production set 310, due to the ability to configure the divisor used in the modulo function described herein and the ability to enumerate which subset of integers between 0 and the divisor that are assigned to each of the development set, quality assurance set, and production set. The utilization of the dynamic allocation system as described herein may allow simultaneous assurance that each email journey, e.g., the production set email journey, the quality assurance set email journey, and the development set email journey, may have an exclusive representation of the prospect cohort 302.

In some embodiments, the production set email journey, the quality assurance set email journey, and the development set email journey may be different for each prospect cohort 302, e.g., a first prospect cohort from a previous day and a second prospect cohort from a current day. For example, the analytics systems 238 may track results in response to a first production set email journey, a first quality assurance set email journey, and a first development set email journey assigned to the first prospect cohort. Based on the tracked results, the email marketing systems 246 may determine a second production set email journey, a second quality assurance set email journey, and a second development set email journey.

In some embodiments, the tracked results for the first development set email journey may be compared with the tracked results for the first production set email journey. If it is determined that the tracked results for the first development set email journey exceed the tracked results for the first production set email journey, the first development set email journey may be determined to be the second quality assurance set email journey for further verification. If it is determined that the tracked results for the first development set email journey fall below the tracked results for the first production set email journey, the first development set email journey may be discarded. In some embodiments, a new set of emails may be determined for the second development set email journey.

In some embodiments, tracked results for the first quality assurance set email journey may be compared with the tracked results for the first production set email journey. If it is determined that the tracked results for the first quality assurance set email journey exceed the tracked results for the first production set email journey, the first quality assurance set email journey may be determined to be the second production set email journey. If it is determined that the tracked results for the first quality assurance set email journey fall below the tracked results for the first production set email journey, the first quality assurance set email journey may be discarded. Accordingly, the second production set email journey, the second quality assurance set email journey, and the second development set email journey may be determined and assigned to a second prospect cohort. In some embodiments, the second prospect cohort may be assigned two email journeys. For example, if the tracked result for the first development set email journey falls below the tracked result for the first production set email journey and is discarded, there may be no email journeys to be assigned for the second quality assurance set email journey. In such instances, a second development set email journey and a second production set email journey may be determined and assigned to the second prospect cohort.

In some embodiments, the tracked results may include the number of the users included in the prospect cohort 302 who have signed up. For example, the prospect cohort 302 may include potential subscribers. Accordingly, the number of users included in the prospect cohort 302 who have signed up in response to the production set email journey, the quality assurance set email journey, and/or the development set email journey may be tracked. In some embodiments, a threshold may be determined for each of the production set email journey, the quality assurance set email journey, and the development set email journey. In such embodiments, the tracked results for each of the production set email journey, the quality assurance set email journey, and the development set email journey may be compared with each respective threshold in order to evaluate the results. For example, the threshold for each of the production set email journey, the quality assurance set email journey, and the development set email journey may be a predetermined number of signups in response to the respective email journeys. In some embodiments, the determined threshold for each of the quality assurance set email journey and the development set email journey may be based on the determined threshold for the production set email journey. While the number of signed up users have been used to explain the tracked results with respect to the prospect cohort 302, production set email journey, the quality assurance set email journey, and the development set email journey, this is for the purpose of explanation only and it is understood that the tracked results may indicate various measurements in alternative embodiments.

With reference to the development set email journey, the tracked results may be compared with the predetermined threshold for a first development set email journey. In some embodiments, the first development set email journey may be discarded and a second development set email journey may be determined if the tracked results fall below the predetermined threshold. In some embodiments, the first development set email journey may be determined to be a second quality assurance set email journey if the tracked results exceed the predetermined threshold. In some embodiments, the differences between the first development set email journey and the second development set email journey may be determined in order to isolate one or more factors that may be positively and/or negatively affecting the first development set email journey and/or the second development set email journey. In some embodiments, one or more development set email journeys may be determined based on the isolated one or more factors.

With reference to the quality assurance set email journey, the tracked results may be compared with the predetermined threshold for a first quality assurance set email journey. In some embodiments, the first quality assurance set email journey may be discarded and a second quality assurance set email journey may be determined, e.g., based on a previous development set email journey, if the tracked results fall below the predetermined threshold. In some embodiments, the discarded first quality assurance set email journey may be modified. In such embodiments, the modified first quality assurance set email journey may be determined to be the second development set email journey. In some embodiments, the first quality assurance set email journey may be determined to be a second production set email journey if the tracked results exceed the predetermined threshold.

With reference to the production set email journey, the tracked results may be compared with the predetermined threshold for a first production set email journey. In some embodiments, the tracked results of the first quality assurance email journey may exceed the tracked results of the first production set email journey. In such embodiments, the first production set email journey may be discarded and the first quality assurance email journey may be determined to be a second production set email journey. In some embodiments, the first production set email journey may continue to be utilized as the second production set email journey if the tracked results for the first quality assurance email journey fall below the tracked results of the first production set email journey.

In some embodiments, the prospect cohort 302 may include a number of users categorized under one or more different groups (also referred to as "segments"). For example, the one or more different groups may include a no box group, which indicates that the users have not yet received a box including wearable items. That is, the no box (No Box) group may include users who have not yet received wearable items via the CaaS electronic platform within a predetermined period of time. For example, the No Box group may include users who have not yet received wearable items within their first 30 days being a member of the prospect cohort 302. As another example, the one or more different groups may include a no return notified (No RN) group, which indicates that the users in this prospect cohort 302 have received a box including wearable items, but have not yet returned the box nor have they provided feedback regarding the wearable items within a predetermined period of time, e.g., their first 30 days as a member of the prospect cohort 302. As yet another example, the one or more different groups may include a less than 50 percent (LT50) group, which indicates that the users in this prospect cohort 302 have received a box of wearable items and have further indicated that they have used less than 50% of the received wearable items within a predetermined period of time, e.g., their first 30 days as a member of the prospect cohort 302. As another example, the one or more different groups may include a greater than, or equal to, 50 percent (GT50) group, which indicates that the users in this prospect cohort 302 have received a box of wearable items and have further indicated that they have used 50% or more of the received wearable items within a predetermined period of time, e.g., their first 30 days as a member of the prospect cohort 302.

Figure 4A:
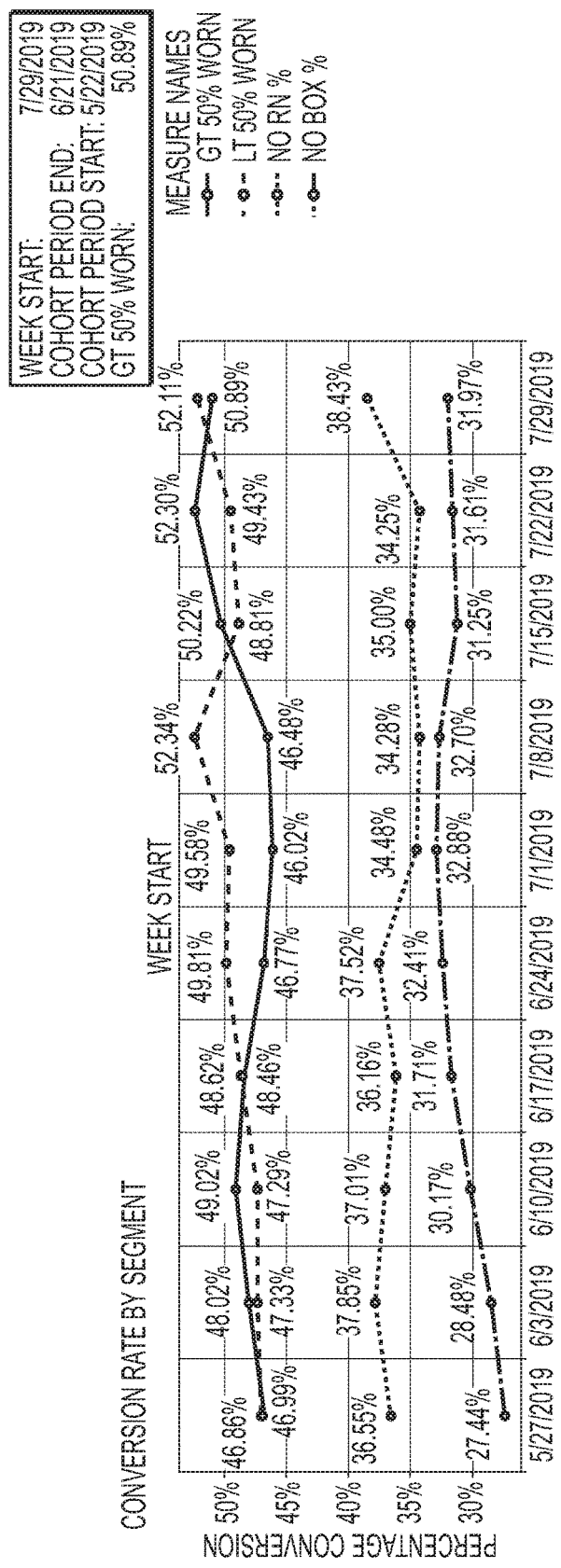
FIGS. 4A-4B depict exemplary methods of utilizing one or more different groups of cohorts according to exemplary embodiments of the present disclosure.
Figure 4B:
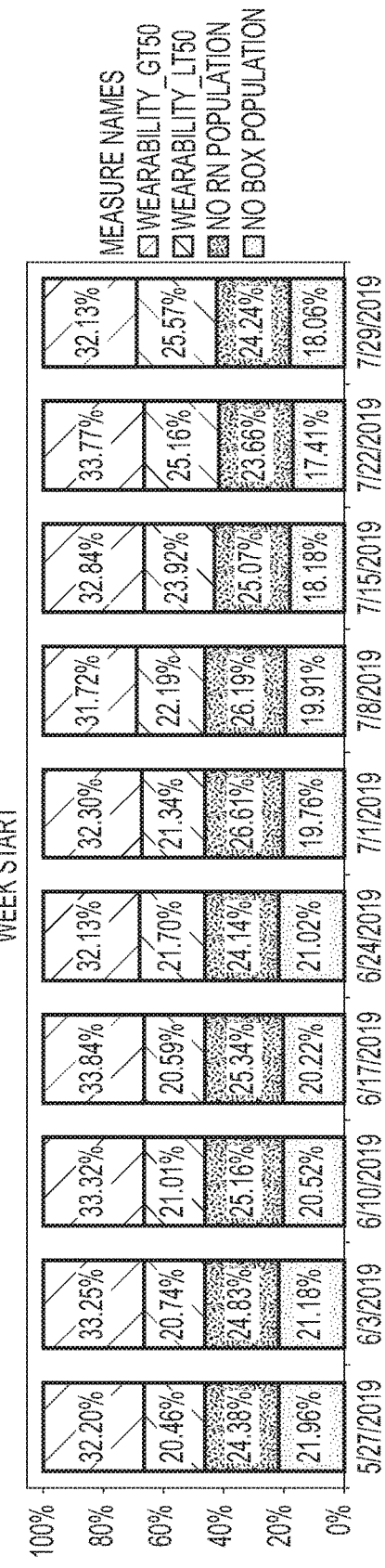

FIGS. 4A-4B depict charts utilizing the one or more different groups of cohorts (i.e., segments) according to some embodiments. As shown in FIG. 4A, the chart indicates a conversion percentage for the No Box segment, the No RN segment, the LT50 segment, and the GT 50 segment according to some embodiments. In the context of the current disclosure, the term "conversion" may refer to users who have converted from a trial period member to a registered subscriber to the CaaS electronic platform. In some embodiments, the trial period may be a period of 30 days. FIG. 4B depicts a chart indicating a population breakdown of the CaaS electronic platform prospect cohort users to the according to the aforementioned segments according to some embodiments.

Figure 5:
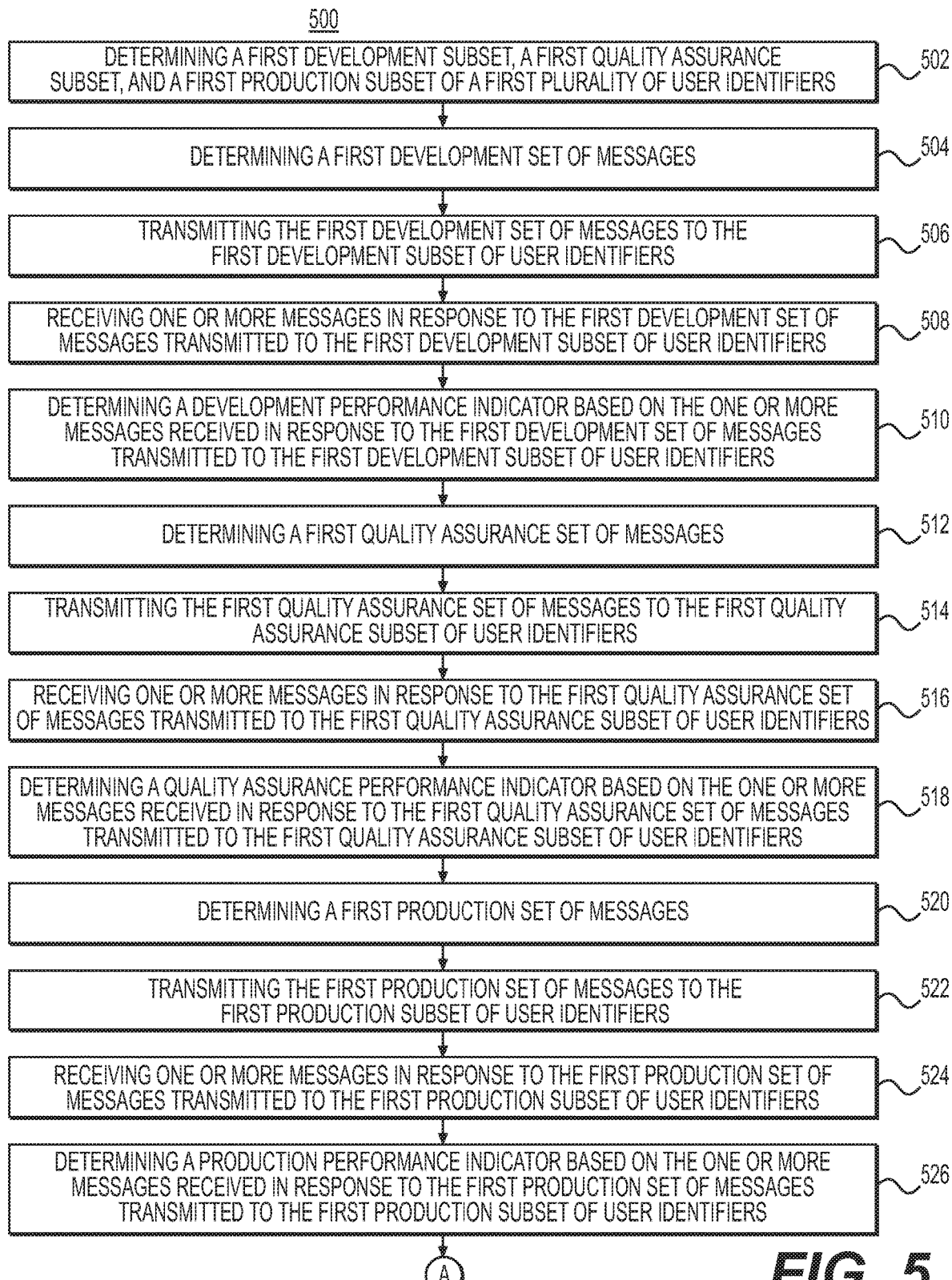
FIG. 5 depicts an exemplary method of optimizing user experience, according to exemplary embodiments of the present disclosure.

FIG. 5 depicts an exemplary method 500 of optimizing user experience, according to exemplary embodiments of the present disclosure. In step 502, a first development subset, a first quality assurance subset, and a first production subset of a first plurality of user identifiers may be determined. In some embodiments, each of the first plurality of user identifiers may be associated with a customer. In some embodiments, the first production subset may include a larger number of user identifiers than the first quality assurance subset, and the first quality assurance subset may include a larger number of user identifiers than the first development subset. In step 504, a first development set of messages may be determined. In step 506, the first development set of messages may be transmitted to the first development subset of user identifiers. In step 508, one or more messages may be received in response to the first development set of messages transmitted to the first development subset of user identifiers. In step 510, a development performance indicator may be determined based on the one or more messages received in response to the first development set of messages transmitted to the first development subset of user identifiers.

In step 512, a first quality assurance set of messages may be determined. In step 514, the first quality assurance set of messages may be transmitted to the first quality assurance subset of user identifiers. In step 516, one or more messages may be received in response to the first quality assurance set of messages transmitted to the first quality assurance subset of user identifiers. In step 518, a quality assurance performance indicator may be determined based on the one or more messages received in response to the first quality assurance set of messages transmitted to the first quality assurance subset of user identifiers.

In step 520, a first production set of messages may be determined. In step 522, the first production set of messages may be transmitted to the first production subset of user identifiers. In step 524, one or more messages may be received in response to the first production set of messages transmitted to the first production subset of user identifiers. In step 526, a production performance indicator may be determined based on the one or more messages received in response to the first production set of messages transmitted to the first production subset of user identifiers.

Figure 6:
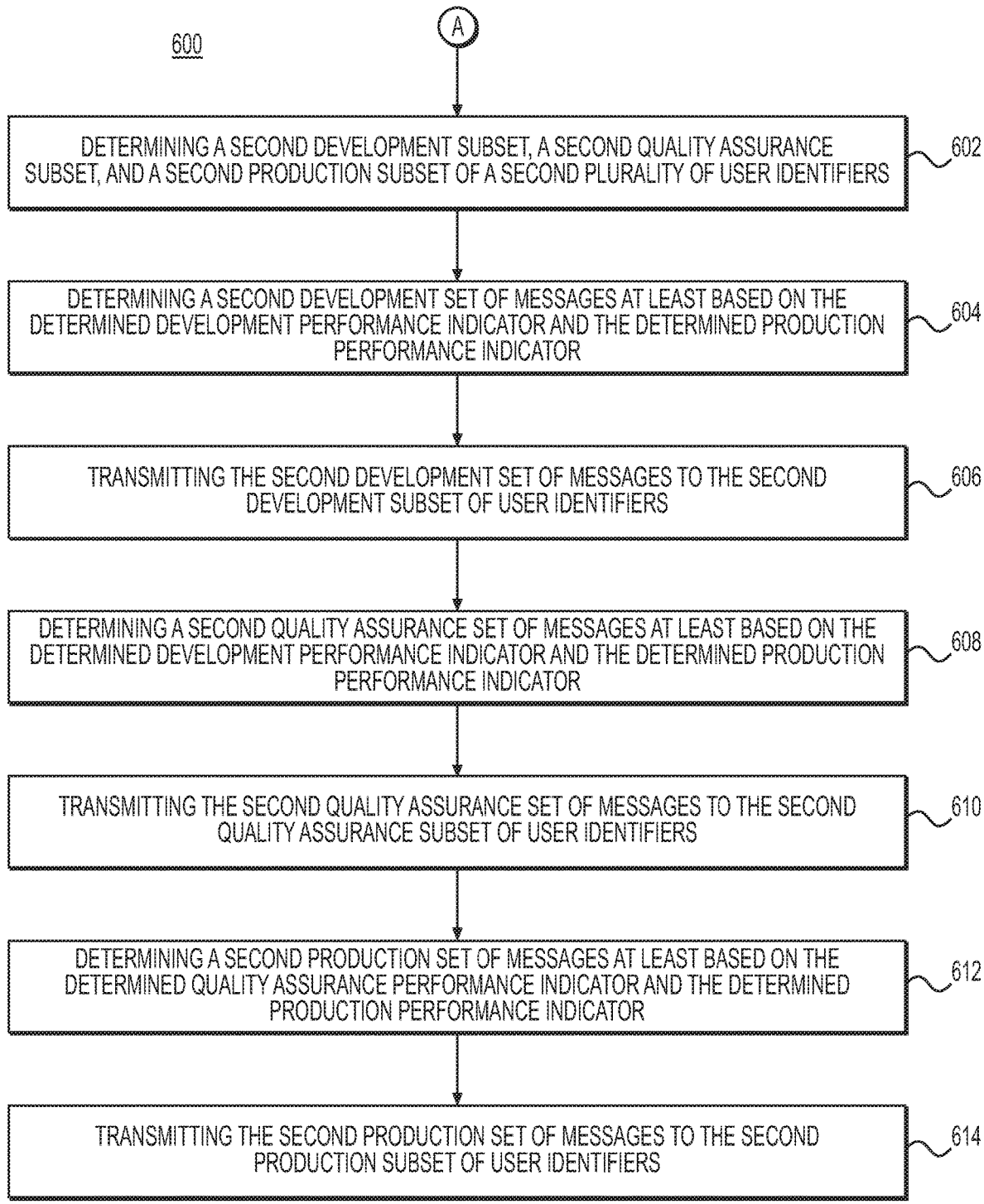
FIG. 6 depicts an exemplary method of optimizing user experience, according to exemplary embodiments of the present disclosure.

FIG. 6 depicts an exemplary method 600 of optimizing user experience, according to exemplary embodiments of the present disclosure. In some embodiments, method 600 may be an extension of method 500, as indicated by step A in FIGS. 5 and 6.

In step 602, a second development subset, a second quality assurance subset, and a second production subset of a second plurality of user identifiers may be determined. In some embodiments, each of the second plurality of user identifiers may be associated with a customer. In some embodiments, the second production subset may include a larger number of user identifiers than the second quality assurance subset, and the second quality assurance subset may include a larger number of user identifiers than the second development subset. In step 604, a second development set of messages may be determined at least based on the determined development performance indicator and the determined production performance indicator. In step 606, the second development set of messages may be transmitted to the second development subset of user identifiers. In step 608, a second quality assurance set of messages may be determined at least based on the determined development performance indicator and the determined production performance indicator. In step 610, the second quality assurance set of messages may be transmitted to the second quality assurance subset of user identifiers. In step 612, a second production set of messages may be determined at least based on the determined quality assurance performance indicator and the determined production performance indicator. In step 614, the second production set of messages may be transmitted to the second production subset of user identifiers.

In some embodiments, the step of determining the second development set of messages at least based on the determined development performance indicator and the determined production performance indicator may include: comparing the determined development performance indicator to the determined production performance indicator; discarding the first development set of messages as a result of determining that the determined development performance indicator is lower than the determined production performance indicator; determining a new set of messages; and assigning the new set of messages as the second development set of messages.

In some embodiments, the step of determining the second quality assurance set of messages at least based on the determined development performance indicator and the determined production performance indicator may include: comparing the determined development performance indicator to the determined production performance indicator; and replacing the first quality assurance set of messages with the first development set of messages to form the second quality assurance set of messages as a result of determining that the determined development performance indicator exceeds determined production performance indicator.

In some embodiments, determining the second production set of messages at least based on the determined quality assurance performance indicator and the determined production performance indicator includes: comparing the determined quality assurance performance indicator to the determined production performance indicator; and replacing the first production set of messages with the first quality assurance set of messages to form the second production set of messages as a result of determining that the determined quality assurance performance indicator exceeds the determined production performance indicator.

Figure 7:
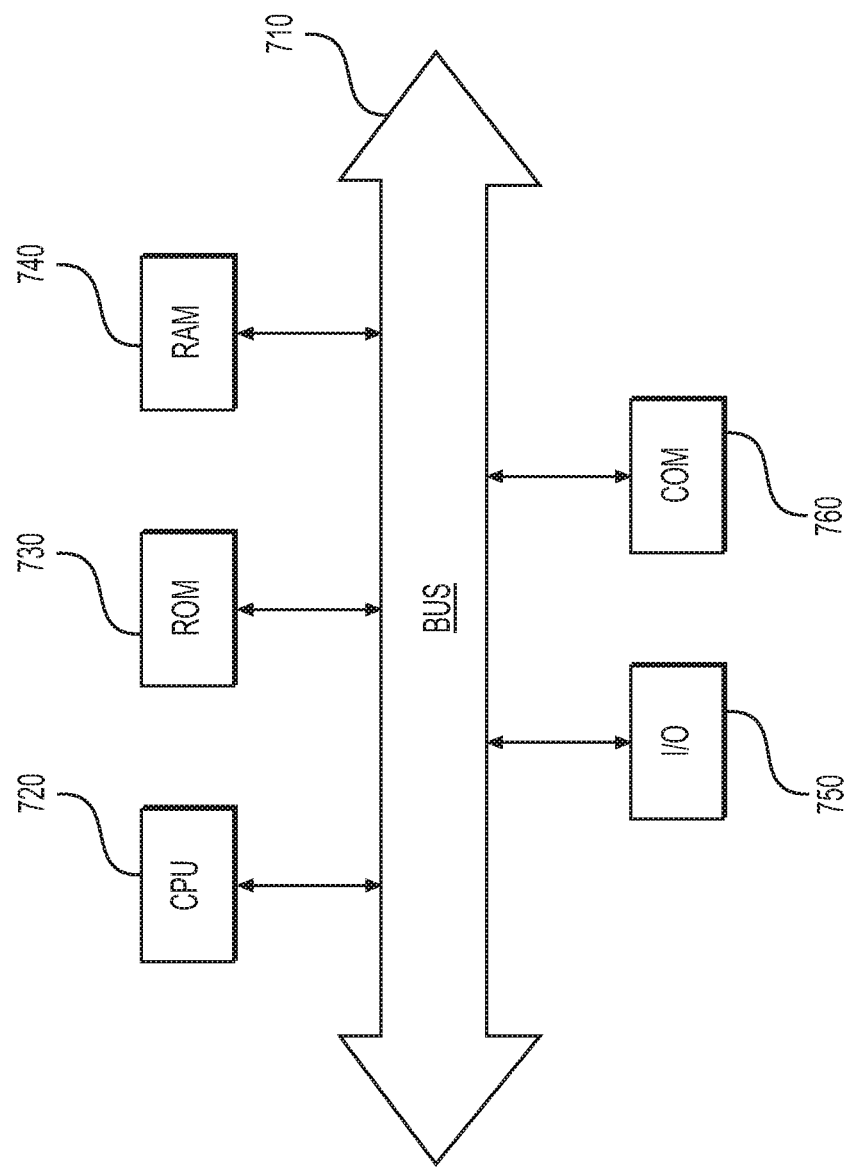
FIG. 7 depicts an exemplary computer device or system, in which embodiments of the present disclosure, or portions thereof, may be implemented.

As shown in FIG. 7, a device 700 used for performing the various embodiments of the present disclosure (e.g., the server system 102, the user devices 112, the employee devices 116, the tenant devices 120, and/or any other computer system or user terminal for performing the various embodiments of the present disclosure) may include a central processing unit (CPU) 720. CPU 720 may be any type of processor device including, for example, any type of special purpose or a general-purpose microprocessor device. As will be appreciated by persons skilled in the relevant art, CPU 720 also may be a single processor in a multi-core/multiprocessor system, such system operating alone, or in a cluster of computing devices operating in a cluster or server farm. CPU 720 may be connected to a data communication infrastructure 710, for example, a bus, message queue, network, or multi-core message-passing scheme.

A device 700 (e.g., the server system 102, the user devices 112, the employee devices 116, the tenant devices 120, and/or any other computer system or user terminal for performing the various embodiments of the present disclosure) may also include a main memory 740, for example, random access memory (RAM), and may also include a secondary memory 730. Secondary memory, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 730 may include other similar means for allowing computer programs or other instructions to be loaded into device 700. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 700.

A device 700 may also include a communications interface ("COM") 760. Communications interface 760 allows software and data to be transferred between device 700 and external devices. Communications interface 760 may include a modem, a network interface (such as an Ethernet card), a communications port, a PCMCIA slot and card, or the like. Software and data transferred via communications interface may be in the form of signals, which may be electronic, electromagnetic, optical, or other signals capable of being received by communications interface 760. These signals may be provided to communications interface 760 via a communications path of device 700, which may be implemented using, for example, wire or cable, fiber optics, a phone line, a cellular phone link, an RF link or other communications channels.

The hardware elements, operating systems, and programming languages of such equipment are conventional in nature, and it is presumed that those skilled in the art are adequately familiar therewith. A device 700 also may include input and output ports 750 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

What is claimed is:

1. A computer-implemented method comprising:
   dynamically allocating, by one or more processors, a first plurality of user identifiers to three or more categorized subsets including a first development subset, a first quality assurance subset, and a first production subset, and wherein each of the first plurality of user identifiers is associated with a customer;
   determining, by the one or more processors, a first development set of email messages at least based on data regarding an electronic transactions platform for subscribing to, purchasing, and/or renting wearable articles;
   transmitting, by the one or more processors, the first development set of email messages to the first development subset of user identifiers;
   receiving, by the one or more processors, one or more messages in response to the first development set of email messages transmitted to the first development subset of user identifiers;
   determining, by the one or more processors, a development performance indicator based on the one or more messages received in response to the first development set of email messages transmitted to the first development subset of user identifiers;
   determining and transmitting, by the one or more processors, a first quality assurance set of email messages to the first quality assurance subset of user identifiers by assigning a previously transmitted development set of email messages as the first quality assurance set of email messages based on a previously determined development performance indicator for the previously transmitted development set of email messages;
   receiving, by the one or more processors, one or more messages in response to the first quality assurance set of email messages transmitted to the first quality assurance subset of user identifiers;
   determining, by the one or more processors, a quality assurance performance indicator based on the one or more messages received in response to the first quality assurance set of email messages transmitted to the first quality assurance subset of user identifiers;
   determining and transmitting, by the one or more processors, a first production set of email messages to the first production subset of user identifiers by assigning a previously transmitted quality assurance set of email messages as the first production set of email messages based on a previously determined quality assurance performance indicator for the previously transmitted quality assurance set of email messages;
   receiving, by the one or more processors, one or more messages in response to the first production set of email messages transmitted to the first production subset of user identifiers;
   determining, by the one or more processors, a production performance indicator based on the one or more messages received in response to the first production set of email messages transmitted to the first production subset of user identifiers; and
   determining a second development set of email messages at least based on the determined development performance indicator and the determined production performance indicator by:
      comparing the determined development performance indicator to the determined production performance indicator; and
      as a result of determining that the determined development performance indicator is lower than the determined production performance indicator, determining and assigning a new set of email messages as the second development set of email messages.

2. The computer-implemented method of claim 1, wherein the first production subset includes a larger number of user identifiers than the first quality assurance subset, and wherein the first quality assurance subset includes a larger number of user identifiers than the first development subset.

3. The computer-implemented method of claim 1, further comprising:
   determining, by one or more processors, a second development subset, a second quality assurance subset, and a second production subset of a second plurality of user identifiers, wherein each of the second plurality of user identifiers is associated with a customer;

determining, by the one or more processors, a second development set of email messages at least based on the determined development performance indicator and the determined production performance indicator;

transmitting, by the one or more processors, the second development set of email messages to the second development subset of user identifiers;

determining, by the one or more processors, a second quality assurance set of email messages at least based on the determined development performance indicator and the determined production performance indicator;

transmitting, by the one or more processors, the second quality assurance set of email messages to the second quality assurance subset of user identifiers;

determining, by the one or more processors, a second production set of email messages at least based on the determined quality assurance performance indicator and the determined production performance indicator; and transmitting, by the one or more processors, the second production set of email messages to the second production subset of user identifiers.

4. The computer-implemented method of claim 3, wherein the second production subset includes a larger number of user identifiers than the second quality assurance subset, and wherein the second quality assurance subset includes a larger number of user identifiers than the second development subset.

5. The method of claim 3, wherein determining the second quality assurance set of email messages at least based on the determined development performance indicator and the determined production performance indicator comprises:

comparing the determined development performance indicator to the determined production performance indicator; and as a result of determining that the determined development performance indicator exceeds the determined production performance indicator, replacing the first quality assurance set of email messages with the first development set of email messages to form the second quality assurance set of email messages.

6. The method of claim 3, wherein determining the second production set of email messages at least based on the determined quality assurance performance indicator and the determined production performance indicator comprises:

comparing the determined quality assurance performance indicator to the determined production performance indicator; and as a result of determining that the determined quality assurance performance indicator exceeds the determined production performance indicator, replacing the first production set of email messages with the first quality assurance set of email messages to form the second production set of email messages.

7. A computer system comprising:

a data storage device storing processor-readable instructions; and a processor configured to execute the instructions to perform a method including:

dynamically allocating a first plurality of user identifiers to three or more categorized subsets including a first development subset, a first quality assurance subset, and a first production subset, and wherein each of the first plurality of user identifiers is associated with a customer;

determining a first development set of email messages at least based on data regarding an electronic transactions platform for subscribing to, purchasing, and/or renting wearable articles;

transmitting the first development set of email messages to the first development subset of user identifiers;

receiving one or more messages in response to the first development set of email messages transmitted to the first development subset of user identifiers;

determining a development performance indicator based on the one or more messages received in response to the first development set of email messages transmitted to the first development subset of user identifiers;

determining and transmitting a first quality assurance set of email messages to the first quality assurance subset of user identifiers by assigning a previously transmitted development set of email messages as the first quality assurance set of email messages based on a previously determined development performance indicator for the previously transmitted development set of email messages;

receiving one or more messages in response to the first quality assurance set of email messages transmitted to the first quality assurance subset of user identifiers;

determining a quality assurance performance indicator based on the one or more messages received in response to the first quality assurance set of email messages transmitted to the first quality assurance subset of user identifiers;

determining and transmitting a first production set of email messages to the first production subset of user identifiers by assigning a previously transmitted quality assurance set of email messages as the first production set of email messages based on a previously determined quality assurance performance indicator for the previously transmitted quality assurance set of email messages;

receiving one or more messages in response to the first production set of email messages transmitted to the first production subset of user identifiers;

determining a production performance indicator based on the one or more messages received in response to the first production set of email messages transmitted to the first production subset of user identifiers; and determining a second development set of email messages at least based on the determined development performance indicator and the determined production performance indicator by:

comparing the determined development performance indicator to the determined production performance indicator; and as a result of determining that the determined development performance indicator is lower than the determined production performance indicator, determining and assigning a new set of email messages as the second development set of email messages.

8. The computer system of claim 7, wherein the first production subset includes a larger number of user identifiers than the first quality assurance subset, and wherein the first quality assurance subset includes a larger number of user identifiers than the first development subset.

9. The computer system of claim 7, wherein the processor is further configured for:

determining a second development subset, a second quality assurance subset, and a second production subset of a second plurality of user identifiers, wherein each of the second plurality of user identifiers is associated with a customer;

determining a second development set of email messages at least based on the determined development performance indicator and the determined production performance indicator;

transmitting the second development set of email messages to the second development subset of user identifiers;

determining a second quality assurance set of email messages at least based on the determined development performance indicator and the determined production performance indicator;

transmitting the second quality assurance set of email messages to the second quality assurance subset of user identifiers;

determining a second production set of email messages at least based on the determined quality assurance performance indicator and the determined production performance indicator; and transmitting the second production set of email messages to the second production subset of user identifiers.

10. The computer system of claim 9, wherein the second production subset includes a larger number of user identifiers than the second quality assurance subset, and wherein the second quality assurance subset includes a larger number of user identifiers than the second development subset.

11. The computer system of claim 9, wherein determining the second quality assurance set of email messages at least based on the determined development performance indicator and the determined production performance indicator comprises:

comparing the determined development performance indicator to the determined production performance indicator; and as a result of determining that the determined development performance indicator exceeds the determined production performance indicator, replacing the first quality assurance set of email messages with the first development set of email messages to form the second quality assurance set of email messages.

12. The computer system of claim 9, wherein determining the second production set of email messages at least based on the determined quality assurance performance indicator and the determined production performance indicator comprises:

comparing the determined quality assurance performance indicator to the determined production performance indicator; and as a result of determining that the determined quality assurance performance indicator exceeds the determined production performance indicator, replacing the first production set of email messages with the first quality assurance set of email messages to form the second production set of email messages.

13. A non-transitory computer-readable medium containing instructions that, when executed by a processor, cause the processor to perform a method comprising:

dynamically allocating a first plurality of user identifiers to three or more categorized subsets including a first development subset, a first quality assurance subset, and a first production subset, and wherein each of the first plurality of user identifiers is associated with a customer;

determining a first development set of email messages at least based on data regarding an electronic transactions platform for subscribing to, purchasing, and/or renting wearable articles;

transmitting the first development set of email messages to the first development subset of user identifiers;

receiving one or more messages in response to the first development set of email messages transmitted to the first development subset of user identifiers;

determining a development performance indicator based on the one or more messages received in response to the first development set of email messages transmitted to the first development subset of user identifiers;

determining and transmitting a first quality assurance set of email messages to the first quality assurance subset of user identifiers by assigning a previously transmitted development set of email messages as the first quality assurance set of email messages based on a previously determined development performance indicator for the previously transmitted development set of email messages;

receiving one or more messages in response to the first quality assurance set of email messages transmitted to the first quality assurance subset of user identifiers;

determining a quality assurance performance indicator based on the one or more messages received in response to the first quality assurance set of email messages transmitted to the first quality assurance subset of user identifiers;

determining and transmitting a first production set of email messages to the first production subset of user identifiers by assigning a previously transmitted quality assurance set of email messages as the first production set of email messages based on a previously determined quality assurance performance indicator for the previously transmitted quality assurance set of email messages;

receiving one or more messages in response to the first production set of email messages transmitted to the first production subset of user identifiers;

determining a production performance indicator based on the one or more messages received in response to the first production set of email messages transmitted to the first production subset of user identifiers; and determining a second development set of email messages at least based on the determined development performance indicator and the determined production performance indicator by:

comparing the determined development performance indicator to the determined production performance indicator; and as a result of determining that the determined development performance indicator is lower than the determined production performance indicator, determining and assigning a new set of email messages as the second development set of email messages.

14. The non-transitory computer-readable medium of claim 13, wherein the first production subset includes a larger number of user identifiers than the first quality assurance subset, and wherein the first quality assurance subset includes a larger number of user identifiers than the first development subset.

15. The non-transitory computer-readable medium of claim 13, the method further comprising:

determining a second development subset, a second quality assurance subset, and a second production subset of a second plurality of user identifiers, wherein each of the second plurality of user identifiers is associated with a customer;

determining a second development set of email messages at least based on the determined development performance indicator and the determined production performance indicator;

transmitting the second development set of email messages to the second development subset of user identifiers;

determining a second quality assurance set of email messages at least based on the determined development performance indicator and the determined production performance indicator;

transmitting the second quality assurance set of email messages to the second quality assurance subset of user identifiers;

determining a second production set of email messages at least based on the determined quality assurance performance indicator and the determined production performance indicator; and transmitting the second production set of email messages to the second production subset of user identifiers.

16. The non-transitory computer-readable medium of claim 15, wherein determining the second quality assurance set of email messages at least based on the determined development performance indicator and the determined production performance indicator comprises:

comparing the determined development performance indicator to the determined production performance indicator; and as a result of determining that the determined development performance indicator exceeds the determined production performance indicator, replacing the first quality assurance set of email messages with the first development set of email messages to form the second quality assurance set of email messages.

17. The non-transitory computer-readable medium of claim 15, wherein determining the second production set of email messages at least based on the determined quality assurance performance indicator and the determined production performance indicator comprises:

comparing the determined quality assurance performance indicator to the determined production performance indicator; and as a result of determining that the determined quality assurance performance indicator exceeds the determined production performance indicator, replacing the first production set of email messages with the first quality assurance set of email messages to form the second production set of email messages.

* * * * *